United States Patent [19]

Badoureaux

[11] Patent Number: 5,348,354
[45] Date of Patent: Sep. 20, 1994

[54] PRONGED FITTING

[75] Inventor: Jean-Pierre Badoureaux, Fillinges, France

[73] Assignee: Parker Hannifin RAK S.A., Ville La Grand, France

[21] Appl. No.: 856,014

[22] Filed: Mar. 23, 1992

[30] Foreign Application Priority Data

Mar. 22, 1991 [FR] France .................. 91 03927

[51] Int. Cl.$^5$ ............................................ F16L 37/084
[52] U.S. Cl. ..................................... 285/308; 285/331; 285/340; 285/39
[58] Field of Search ............... 285/104, 105, 340, 39, 285/308, 331

[56] References Cited

U.S. PATENT DOCUMENTS

| | | | |
|---|---|---|---|
| 4,630,848 | 12/1986 | Twist et al. | 285/340 X |
| 4,722,558 | 2/1988 | Badoureaux | 285/340 X |
| 5,029,908 | 7/1991 | Bellsaire | 285/340 X |

Primary Examiner—Dave W. Arola
Attorney, Agent, or Firm—Christopher H. Morgan

[57] ABSTRACT

This fitting is of the type whose body has a cross bore and at one end, means to connection to one of two elements to be connected using said tubes while at its other end it has an annular chamber coaxial to the bore meant to receive one end of a tube by simple engagement, the chamber holding various annular mechanisms to retain the tube, coaxial to the chamber and arranged between its wall and the tube, that is, a retainer ring partially closing the chamber and able to slide in it, a waterproof seal and a part with radial prongs. According to the invention, the fitting is made up of, on one hand, a body 4 having said cross bore 10 and said connection means 11 and 12 and, on the other hand, of a bushing 5 which can be assembled in the body 4, limiting said chamber 20 and made up of means 30 to 33 for retaining the various aforementioned mechanisms 21, 22 and 23 which it holds.

4 Claims, 2 Drawing Sheets

PRONGED FITTING

DESCRIPTION

The present invention concerns an improved pronged fitting.

The petitioner holds French Patent No. 85 10598 registered on Jul. 2, 1985, concerning a pronged fitting for flexible or rigid tube possibly equipped with an external annular groove. This fitting has a body with a cross bore and, at one end, a male or female threaded nozzle for its moveable connection to one of the two elements to be connected using said tubes; its other end has an annular chamber coaxial to the said bore, meant to receive and retain one end of a flexible tube by simple engagement. To do this, the chamber holds various annular mechanisms, coaxial to the chamber itself and arranged between its wall and the tube, which are, in order from its opening: a retainer ring, partially closing the chamber, from which it projects, able to slide in it; a watertight seal sitting against the ring; a part sitting against the seal, supporting another part with prongs bent toward the bottom of the chamber and projecting radially inward; a retaining ring situated between said support piece and said pronged piece, which allows the latter to be kept between it and a shoulder set in the interior wall of the chamber; and a watertight seal placed against the edge of the chamber.

The angle of the prongs allows them to facilitate the engagement of the tube and to obstruct its disengagement, as a backward movement of the tube causes the prongs to tilt and enter into the wall of the tube.

To remove the tube from the fitting, press on the retainer ring to move it towards the bottom of the chamber, which causes the seal and the support part to be moved. This latter has tabs aligned in the direction of said prongs, which they lean on during this movement in such a way as to override them in relation to the tube wall, that is by causing them to tilt in the direction opposite that which would allow them to penetrate this wall.

Fittings according to this patent are completely satisfactory, in practice, but still present the inconveniences of requiring the manufacturer to make and stock large quantities of this type of fitting, which differ from one another by their connection means situated on the side of the body opposite the chamber (threaded nozzles, "barbed" or "bulb" nozzles, or nozzles which have an identical pronged fitting), and being complex to manufacture since, including the body, they have no less than seven constituent elements each. Furthermore, in existing fittings, the retainer ring projects from the body, as previously noted, which makes its involuntary action possible.

This invention intends to remedy all of these inconveniences.

To this end, the pronged fitting for flexible or rigid tubes possibly equipped with an annular groove, of the type whose body has a cross bore, and at one end, means to connect to one of the two elements to be connected using said tubes while at the other end there is an annular chamber coaxial to the bore meant to receive one end of a tube by simple engagement, the chamber holding various annular mechanisms for retaining the tube, coaxial to the chamber itself and arranged between its wall and the tube, which are: a retainer ring partially forming the chamber and able to slide in it, a waterproof seal and a part with radial prongs. It is characterized by its constituent parts, on one hand, by a body with said cross bore and said connection means, and on the other hand, by a bushing which can be assembled in the body, limiting said chamber and including means to hold the various aforementioned mechanisms which the chamber holds.

Thus, to make fittings, it is possible to manufacture separately standard bushings and bodies having, at one end, a section allowing them to be assembled with the bushings, and at the other end, various connection means such as those cited above, then to assemble the bushings and bodies as required by demand. The manufacture and setup of these fittings are greatly simplified and the stocks necessary to respond to demand are quire reduced, as assembly is done at the last minute and as required by demand.

Preferably, the means for retaining the mechanisms held in the chamber are made up of, on the ring side, a should and, on the side of the pronged part, tips projecting radially inward from the face of the bushing limiting the chamber, beyond which the said pronged part can be engaged due to its relative elasticity.

According to a preferred way of manufacturing the invention, the ring has, on the pronged part side and forming one piece with it, a tubular extension which is coaxial to it, whose wall is clearly not as thick as the ring's wall and which projects from its end annular face, this extension being divided into two parts; the first is situated on the ring side, which is connected to the ring approximately equidistant from the edges limiting the said end annular face and which includes holes arranged on its periphery; the second, situated on the prong side of said pronged part, has an internal diameter not less than the external diameter of the tube and is able, when moved in the direction of the prongs, to sit against them in such a way as to cause them to tilt in the direction to override them in relation to the wall of the tube, a waterproof seal being over-molded around the said first part of the extension.

Of course, the position of the wall in said first part of the extension on the annular face of the ring and the holes which it includes allow the seal over-molded on the ring and said second part made up of a support piece and the prongs' action to work together. Thus constructed, the fitting includes five elements, including the body, whereas the one made by the previous technique included seven.

Furthermore, from the side opposite the pronged part, the end of the ring is set back from the end of the bushing, which impedes any involuntary action, as this end of the bushing can only include reduced openings which impede access to the ring other than with a tool intended for that purpose.

In any case, the invention will be well understood with the help of the description which follows, in reference to the attached schematic drawing which illustrates, as a non-limiting example, a preferred way of making the fitting in question.

Figure 2:
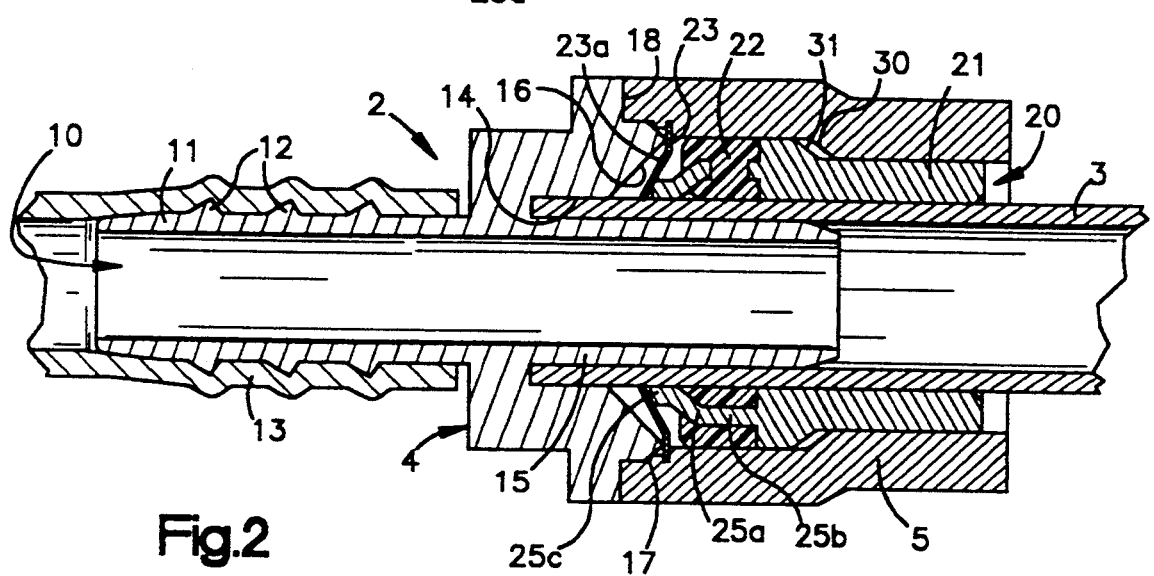
FIGS. 2 and 3 are longitudinal cutaway views of the fitting in two different functioning positions.
Figure 3:
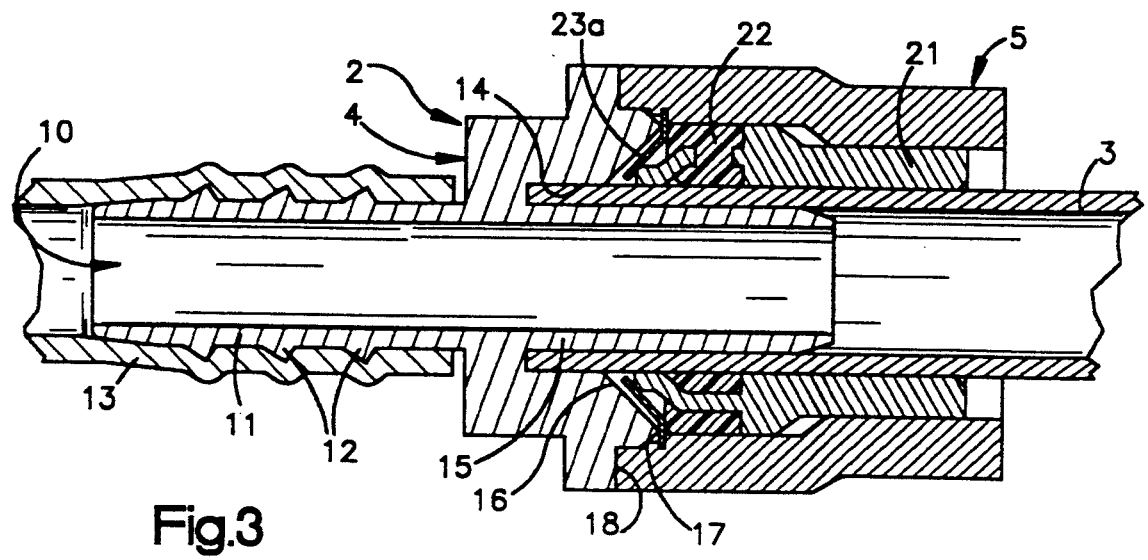

FIGS. 2 and 3 illustrate an improved prong fitting 2 for flexible tubes 3 or rigid tubes possibly equipped with an annular groove.

It is made up, on one hand, of a body 4 and on the other hand, a bushing 5 which can be assembled in the body 4, particularly by soldering.

The body 4 has a cross bore 10 and, at one end, a tubular "barbed" nozzle 11, which includes barbs 12, for fixing and holding a tube 13, while at its other end, it has a bore 14 from which projects, coaxially to itself, a tubular nozzle 15 on which tube 3 is meant to be fitted. On the face of the body assembly 4 to the bushing 5, concentrically to the nozzle 15, the opening of said bore 14 is tooled into a tapered recess 16, with a tapered chamfer arranged in the edge of the wall which limits the opening of the recess 16, and a shoulder 18 is meant for engaging the end of the bushing 5.

The latter limits an annular chamber 20, coaxial to the bore 14 while the bushing 5 is assembled in body 4, holding various annular mechanisms for retaining the tube 3, coaxial to the chamber itself and set between its wall and the tube 3, that is a retainer ring 21 partially closing the chamber 20 and able to slide in it, a waterproof seal 22 and a washer 23 having prongs 23a tilted towards the bottom of the chamber 20 and projecting radially inward.

The ring 21 has, on the side of washer 23 and forming a single piece with it, a tubular extension, which is coaxial to it and whose wall's thickness is clearly less than its own. The extension consists of a conical wall 25a which divides it into two parts 25b and 25c; the first, 25b situated on the side of ring 21, is connected to the end annular face of the ring 21 approximately equidistant from the edges limiting this end annular face and which consist of holes arranged on its periphery; and the second 25c, situated on the side of the prongs 23a, has an internal diameter not less than the external diameter of the tube 3 and is able, when moved in the direction of the prongs 23a, to sit against the latter in such a way as to cause them to tilt in the direction to override them in relation to the wall of the tube 3 (FIG. 3).

The waterproof seal 22 is over-molded around part 25b of the extension 25; this over-molding is made possible due to the position of part 25b on the end annular face of the ring 21 and due to the holes included in it.

The bushing 5 includes a conical shoulder 30 against which an additional shoulder 31 arranged in the wall of the ring can lean, as well as a shoulder 32 and several tips 33 between which the washer 23 can lodge itself.

Figure 1:
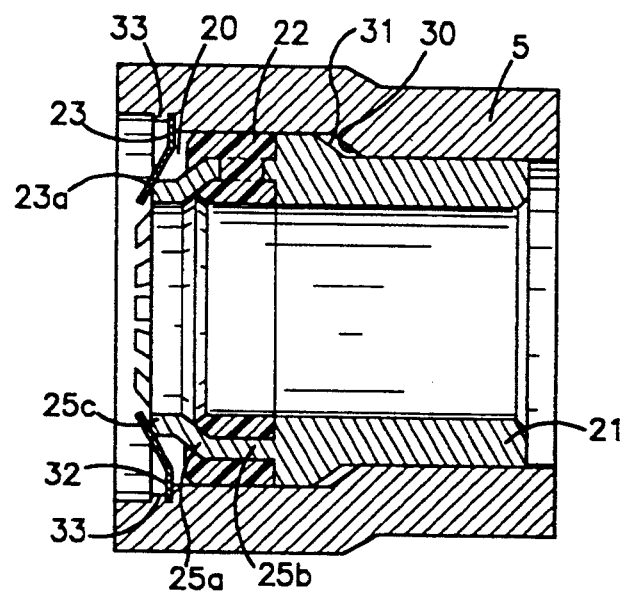
FIG. 1 is a longitudinal cutaway view of one of its constituent subassemblies.

Thus, after introducing the ring 21/seal 22/extension 25 assembly in the chamber 20 and putting the washer 23 in place, bushing 5 retains the various mechanisms held in it and constitutes a standard assembly, represented by FIG. 1, which could be, depending on demand, assembled in the body 4 equipped with a "barbed" nozzle or in other bodies equipped with various nozzles (threaded, "bulb" or having a symmetrically arranged bushing 5), the chamfer 17 of the body 4 permitting you to organize the space in which the tips 33 and the recess 16, which hold the prongs 23a, can lodge.

Figure 4:
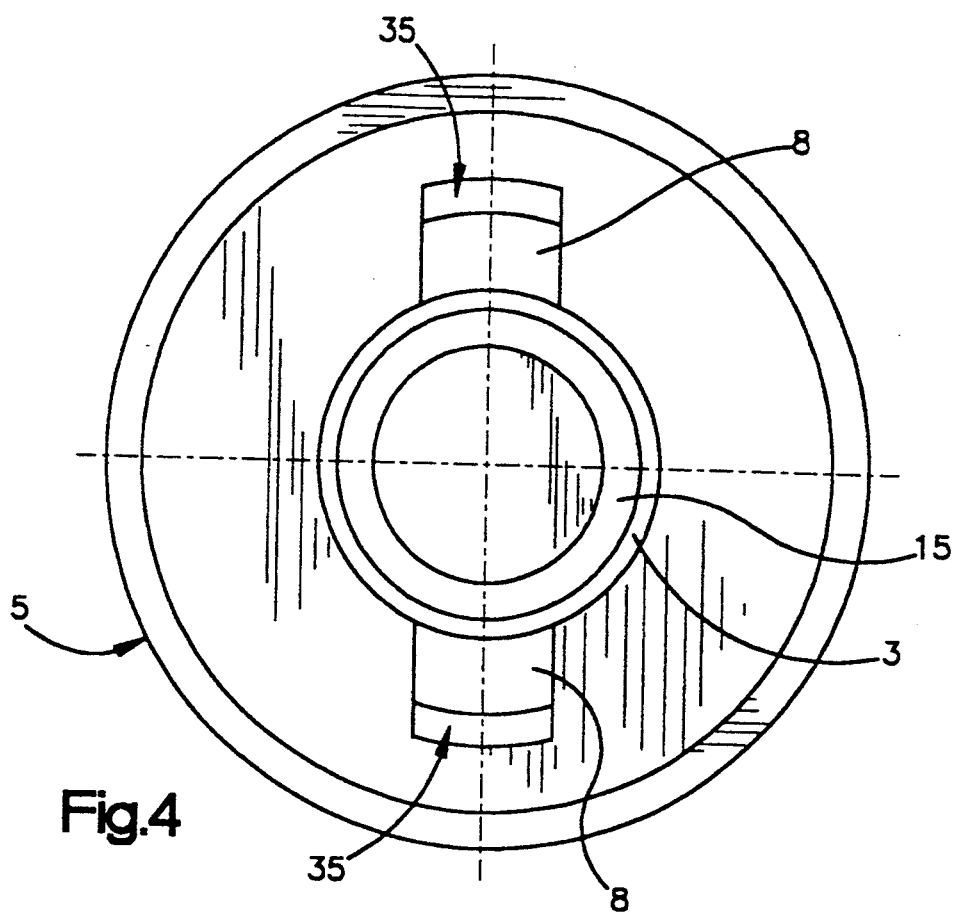
FIG. 4 is an axial view of one end of the fitting.
Figure 5:
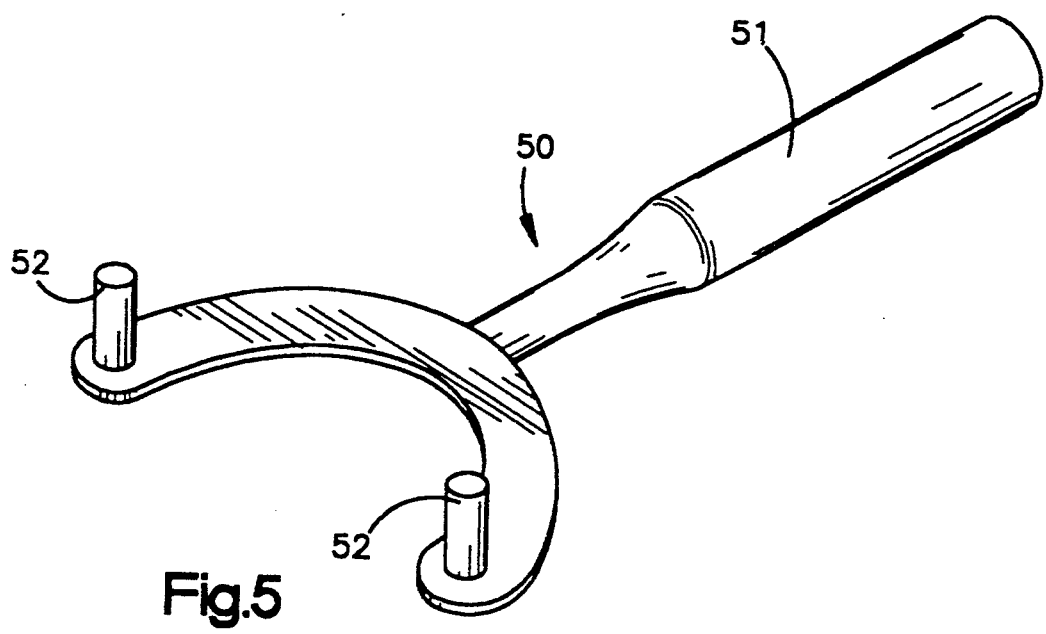
FIG. 5 is a perspective view of an instrument which allows the fitting to be activated.

FIGS. 1 to 3 show that, moreover, the end of the ring 8 is set back from the end of the bushing 5 where the tube is inserted. As shown in FIG. 4, this end of the bushing 5 could be closed if not for two holes 35 diametrically arranged. Due to these arrangements, the ring 8 cannot be moved in the direction where it would allow the prongs 23a to be overridden, as it appears in comparison with FIGS. 2 and 3, except with use of a tool 50 illustrated in FIG. 5, which, besides its handle 51, includes two fingers 52 intended to be inserted in the holes 35, pressing on the ring 8.

What is claimed is:

1. A pronged fitting for connection with a tube, comprising:
    a) a body with a cross bore therethrough having one end through which said cross bore extends and with cross bore connection means for connecting said cross bore for fluid flow, and another end having:
        a tubular nozzle on which a tube can be received and through which said cross bore extends, and
        a bushing connection surface;
    b) a bushing sealingly connected to said bushing connection surface and forming, together with said tubular nozzle, an annular chamber coaxial to said cross bore;
    c) a retainer ring fitting radially closely within and able to slide axially in said annular chamber;
    d) an annular seal disposed in said annular chamber and extending between and engaging said bushing and a tube received on said tubular nozzle for providing a fluid seal therebetween;
    e) a pronged washer connected within said bushing and disposed in said annular chamber and having prongs extending radially inwardly to engage and hold a tube received on said tubular nozzle; and means for limiting the sliding movement of said retainer ring away from said pronged washer;
    f) said retainer ring having an extension with holes therethrough which faces said prongs of said washer so that sliding movement of said retainer ring within and axially along said annular chamber toward said prongs causes said extension to engage said prongs so as to release the hold of said prongs on a tube received on said tubular nozzle and held by said prongs and wherein said annular seal extends about said extension and through said holes with a portion of the extension extending beyond said annular seal toward said prongs of said washer for said engagement with said prongs.

2. The fitting of claim 1 wherein said means for limiting sliding movement of said retainer ring includes said retainer ring having a shoulder extending radially outwardly therefrom and said bushing having a shoulder extending radially inwardly therefrom which faces said retainer ring shoulder and thereby limits the sliding movement of said retainer ring.

3. The fitting of claim 1 wherein said washer and bushing have coacting means therebetween for fixing said washer to said bushing.

4. The fitting of claim 1 wherein said bushing has an end opposite said connection to said body, said bushing end enclosing said retainer ring except for at least one opening therethrough which opening provides a restricted access to said retainer ring to allow movement of said retainer ring so as to release the hold of said prongs on a tube received on said tubular nozzle and held by said prongs.

* * * * *